United States Patent [19]

Haferl

[11] Patent Number: 4,488,181
[45] Date of Patent: Dec. 11, 1984

[54] ELECTRON BEAM SUPPRESSION CIRCUIT FOR A TELEVISION RECEIVER

[75] Inventor: Peter E. Haferl, Adliswil, Switzerland

[73] Assignee: RCA Corporation, New York, N.Y.

[21] Appl. No.: 434,315

[22] Filed: Oct. 14, 1982

[30] Foreign Application Priority Data

Apr. 23, 1982 [GB] United Kingdom ................. 8211831

[51] Int. Cl.³ .............................................. H04N 5/30
[52] U.S. Cl. .................... 358/220; 358/242; 315/381
[58] Field of Search ............... 358/219, 220, 242, 243; 328/8, 9, 10; 315/380, 381, 384, 386

[56] References Cited

U.S. PATENT DOCUMENTS

| | | | |
|---|---|---|---|
| 2,913,621 | 11/1959 | Luther et al. | 315/381 |
| 2,940,004 | 6/1960 | Bonner | 315/381 |
| 3,407,330 | 10/1968 | Wilmarth | 315/381 |
| 3,944,880 | 3/1976 | Harao et al. | 315/380 |
| 4,056,758 | 11/1977 | Schaas | 315/381 |
| 4,218,720 | 8/1980 | Kam et al. | 358/243 |
| 4,261,006 | 4/1981 | Weintraub et al. | 358/3 |
| 4,282,460 | 8/1981 | Luz et al. | 315/411 |
| 4,340,910 | 7/1982 | Valdes | 358/243 |
| 4,390,817 | 6/1983 | Johnson | 315/384 |

FOREIGN PATENT DOCUMENTS 268394 2/1969 Austria.
1464611 12/1968 Fed. Rep. of Germany.
1920134 12/1969 Fed. Rep. of Germany.

OTHER PUBLICATIONS

Funktechnik, vol. 30, No. 19/1975, pp. 600-611, entitled, "A New Ultrasonic Remote Control for Color Television Receivers".

Primary Examiner—John C. Martin
Assistant Examiner—Michael D. Parker
Attorney, Agent, or Firm—Eugene M. Whitacre; Paul J. Rasmussen; Joseph J. Laks

[57] ABSTRACT

The picture tube of a television receiver includes, inter alia, a plurality of electrodes to develop and accelerate an electron beam, and a phosphor screen on which the electron beam impinges. A deflection generator is coupled to a deflection winding for generating scanning current to produce a sweep of the electron beam across the phosphor screen. A remote control circuit develops an on/off command signal for switching the television receiver between normal run and standby modes of operation. A first switch is responsive to the command signal and disables normal generation of the scanning current upon the occurrence of the off-state of the command signal to inhibit normal sweep of the electron beam. A second switch, also responsive to the command signal, applies to one of the electrodes of the picture tube, such as the grid electrode, a blocking potential upon the occurrence of the off-state of the command signal to suppress generation of the electron beam prior to the disablement of scanning current generation.

18 Claims, 1 Drawing Figure

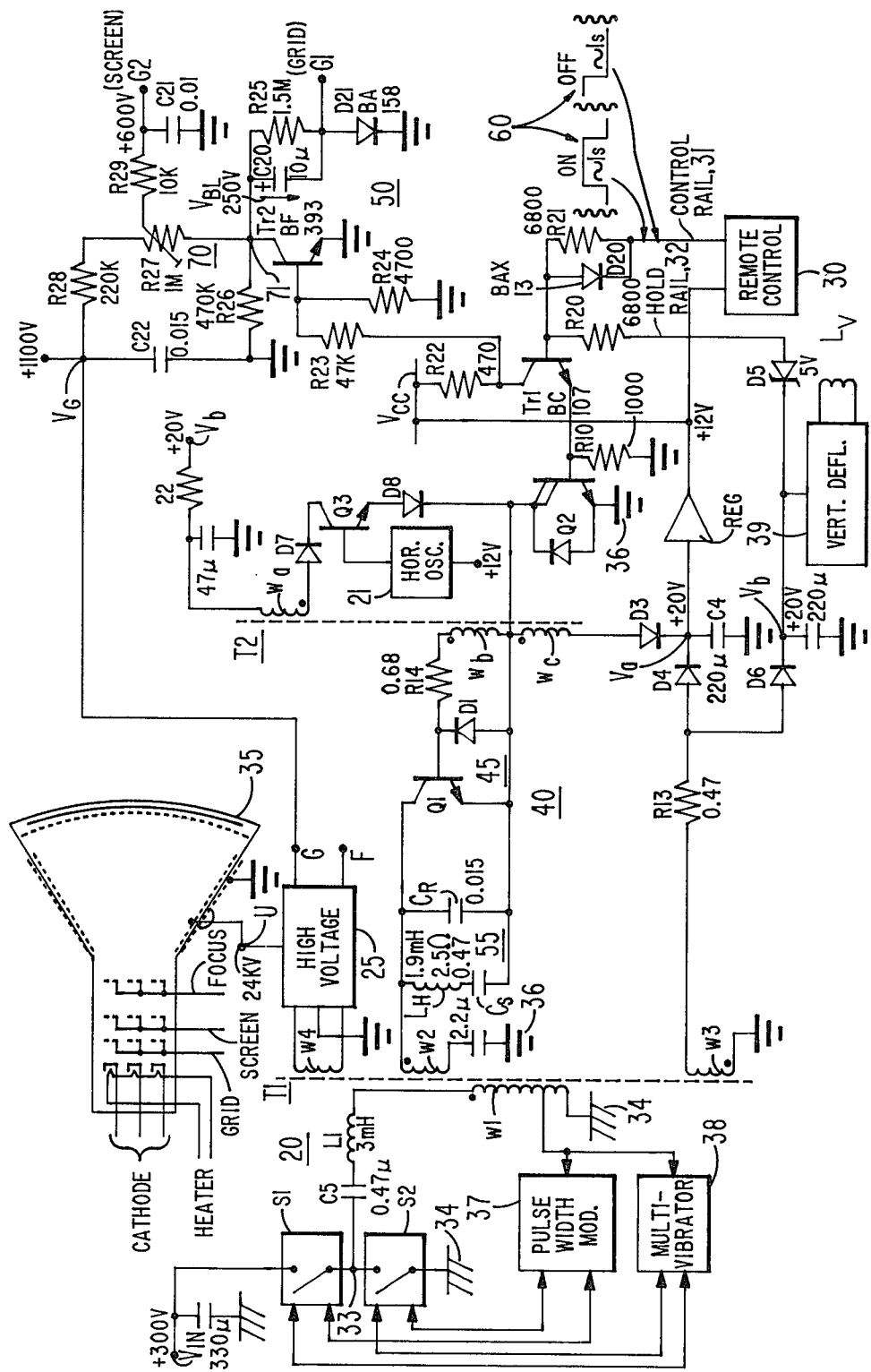

ELECTRON BEAM SUPPRESSION CIRCUIT FOR A TELEVISION RECEIVER

This invention relates to a circuit for rapidly suppressing the generation of an electron beam of the picture tube of a television display system when the display system is turned off.

The phosphor screen of the picture tube of a television receiver should be protected against the impinging of a continuous beam of electrons on the same region of the screen when horizontal and vertical sweep collapse after the television receiver is turned off. If the electron beam continuously impinges on the screen at the same spot, even for a relatively short period of time, the capability of the phosphor to fluoresce at that spot may be destroyed.

When the television receiver is in the normal operating mode, the electron beam is rapidly swept across the surface of the phosphor screen. Hence the electron beam does not impinge on any one location for any appreciable time, preventing damage to the screen from occurring.

When the television receiver is turned off, the scanning currents in the horizontal and vertical deflection windings may collapse before the energizing potential for the various electrodes of the picture tube decay sufficiently to prevent the generation and acceleration of an electron beam. Such a situation may be especially likely to exist in a remote control television receiver such as disclosed in the U.S. patent application of P. E. Haferl, Ser. No. 382,493, filed May 27, 1982, entitled TELEVISION RECEIVER STANDBY CIRCUIT. In such a remote controlled television receiver, the television receiver is placed in the standby mode of operation by directly disabling the horizontal deflection generator, thereby disabling most of the television receiver operating voltage supplies. By directly disabling the horizontal deflection generator to place the television receiver in the standby mode of operations, the horizontal scanning current rapidly decays to zero, quickly inhibiting normal horizontal sweep of the electron beam.

A feature of the invention is the suppression of the generation of the electron beam concurrently with the disablement of the deflection generator to prevent phosphor screen burn-in. A command signal having a first and second state, such as a remote on/off command signal, is developed. A first switch coupled to the deflection generator is responsive to the command signal and disables normal generation of the scanning current upon the occurrence of a given state of the command signal, such as upon the occurrence of the off-state of the on/off command signal. With the disablement of the scanning current generation, normal sweep of the electron beam is inhibited. A second switch is also responsive to the command signal for applying to an electrode of the picture tube, such as the grid electrode, a blocking potential upon occurrence said given state of the command signal to suppress generation of the electron beam.

The FIGURE illustrates a remote controlled power supply and deflection circuit including an electron beam suppression circuit embodying the invention.

In the remote controlled power supply and deflection circuit for a television receiver, illustrated in the FIGURE, a switched mode power supply 20 is coupled to the primary winding w1 of a horizontal output transformer T1. A horizontal deflection generator 40 is coupled to a secondary winding w2 that is conductively isolated from primary winding w1. Switched mode power supply 20 comprises a push-pull converter arrangement such as the single conversion system (SICOS) power supply described in the aforementioned U.S. patent application of P. E. Haferl, hereby incorporated by reference.

Power supply 20 includes controllable, bi-directionally conductive switches S1 and S2 coupled together at an output terminal 33. Coupled between output terminal 33 and earth ground 34 is the series arrangement of a capacitor C5, an inductor L1 and primary winding w1 of horizontal output transformer T1. Switches S1 and S2 therefore form a push-pull arrangement with the aforementioned series arrangement.

During normal running operation, horizontal deflection generator 40 produces, during the horizontal retrace interval, a pulse voltage across secondary winding w2 that is then transformer coupled to the magnetically tightly coupled winding w1. The pulse voltage appearing at a tap terminal of winding w1 is applied to a pulse width modulator control circuit 37 of the switching power supply 20. Modulator control circuit 37 pulse width modulates the switching of push-pull switches S1 and S2 so as to regulate the amplitude of the pulse voltages developed across the horizontal output transformer windings against variations in the unregulated input voltage $V_{in}$ and against loading variations produced by the load circuits coupled to the transformer.

At a controllable instant within each horizontal trace interval, switch S1 becomes conductive and energy is stored in the magnetic field of inductor L1 by current flowing from the source of input voltage $V_{in}$. At the beginning of the horizontal retrace interval, when horizontal trace switch 45 of horizontal deflection generator 40 becomes cutoff, and when the deflection retrace circuit 55 is formed, switch S1 becomes non-conductive and switch S2 becomes conductive.

A transfer of energy is initiated from inductor L1 by way of flyback transformer T1 to the deflection retrace circuit 55 and to the retrace driven load circuits coupled to the flyback transformer, such as the ultor high voltage circuit 25 coupled to high voltage winding w4.

High voltage circuit 25, in addition to providing the ultor voltage at a terminal U for the final anode electrode of color picture tube 35, also provides energizing potentials for several of the other electrodes. At a terminal F, for example, a focus voltage is provided for energizing the focus electrodes of picture tube 35. At a terminal G, a DC voltage $V_G$ is provided for energizing, in a manner hereafter to be described, the screen and grid electrodes. The cathode electrodes and their heater elements are energized by conventional circuitry, not illustrated in the FIGURE.

With all the electrodes of picture tube 35 properly energized, electron beams are generated at the cathode electrodes and are accelerated to impinge on the phosphor screen display surface. As the electron beams travel within picture tube 35, they encounter the magnetic fields produced by the scanning currents flowing in the horizontal deflection winding $L_H$ and the vertical deflection winding $L_V$. These scanning currents are produced by horizontal deflection generator 40 and vertical deflection generator 39. The magnetic fields produced by the sawtooth horizontal and vertical scanning currents deflect the electron beams so as to produce a sweep of these beams in a raster pattern across the phosphor screen.

During the normal running mode of television receiver operation, a bi-directionally conductive, controllable switch Q2, comprising a Darlington transistor with an integrally formed anti-parallel diode, is maintained in continuous, saturated conduction. Switch Q2 provides a path to ground for horizontal deflection generator 40, enabling power to be transferred thereto from switching power supply 20 by way of windings w1 and w2 of horizontal output transformer T1. Switch Q2 also provides a path to ground for the current in horizontal driver transistor Q3 that is switched at a horizontal rate by a horizontal oscillator 21. The switching of transistor Q3 couples horizontal drive signals to horizontal output transistor Q1 of trace switch 45 by way of windings $w_a$ and $w_b$ of a horizontal driver transformer T2.

The voltage $V_a$ developed by trace rectification of the voltage across horizontal output transformer winding w3, reverse biases a diode D3 to prevent current from flowing in winding $w_c$ of horizontal driver transformer T2 during normal running mode of television receiver operation.

The voltage $V_a$ is applied to a +12 regulator to develop a regulated collector supply voltage $V_{cc}$ for a transistor Tr1. Transistor Tr1 is maintained in continuous conduction by current supplied along a hold rail 32, via a zener diode D5, from a source of voltage $V_b$. The voltage $V_b$ is derived by trace rectification of the voltage developed across horizontal output transformer winding w3.

To switch operation of the television receiver into the standby mode, a remote control circuit 30 generates the off-state of a command signal 60 on a control rail 31. The off-state command signal may, for example, be a one second negative going pulse that is applied to the base of transistor Tr1 through a resistor R21. Upon receipt of the off-state of the command signal, transistor Tr1 becomes cut off, cutting off conduction of the Darlington transistor Q2, thereby disconnecting horizontal deflection generator 40 from chassis ground 36.

The current in winding w2 of horizontal output transformer T1, when flowing out of the dotted terminal of the winding, can return to that winding only by flowing through winding $w_c$ of horizontal driver transformer T2, diode D3 and the $V_a$ voltage supply or loads coupled thereto. The current in winding $w_c$ induces a current in winding $w_b$ that forward biases horizontal output transistor Q1 to provide a direct path for current from winding w2 of horizontal output transformer T1 to winding $w_c$ of horizontal driver transformer T2.

Windings $w_b$ and $w_c$ form a regenerative arrangement to maintain horizontal output transistor Q1 forward biased for continuous, saturated conduction during standby. Thus during standby, a path for the bi-directional flow of current through trace switch 45 is provided. Trace switch 45 produces, in effect, a short circuit across horizontal deflection retrace capacitor $C_R$, disabling the operation of deflection retrace circuit 55 and disabling the generation of horizontal scanning current during standby.

With deflection retrace circuit 55 inoperative, the pulse voltage across winding w1 of transformer T1 is absent. Synchronized operation of pulse width modulator circuit 37 is disabled and a free running multivibrator 38, previously disabled by application thereto of the pulse voltage at the tap terminal of winding w1, is now enabled. Multivibrator 38 produces a high frequency switching of switches S1 and S2 at a fixed duty cycle and at a frequency around that of the horizontal deflection frequency. A high frequency, fixed duty cycle, substantially rectangular-wave voltage of reduced amplitude is developed across windings w1 and w2 during standby.

The switching voltage across winding w2 is applied by way of continuously conducting trace switch 45 to the top terminal of winding $w_c$ of horizontal driver transformer T2. During standby, the rectangular-wave voltage developed across winding $w_c$ is rectified by diode D3 to produce a standby voltage, $V_a$, from which is derived a +12V standby voltage. The +12V standby voltage powers remote control circuit 30 and horizontal oscillator 21. The +12V standby voltage is also used as the standby supply voltage $V_{cc}$ of transistor Tr1.

To switch operation of the television receiver back from standby to normal running mode of operation, the on-state of on/off command signal 60 is applied to the base of transistor Tr1 along control rail 31 for approximately one second to turn on both transistor Tr1 and controllable switch Q2. With the bottom terminal of horizontal deflection generator 40 now again connected to chassis ground 36, normal operation of horizontal deflection generator 40 and switching power supply 20 can resume.

To develop the steady state electrode voltages, for the screen and grid electrodes, the direct voltage, $V_G$, developed at terminal G of high voltage circuit 25 is applied to a voltage divider 70 comprising resistors R25–R28. A filter capacitor C22 is coupled between terminal G and chassis ground. The grid voltage terminal G1 is coupled to the junction of the bottom terminal of resistor R25 and the anode of a diode D21 that has its cathode coupled to chassis ground. The screen voltage terminal G2 is coupled through a resistor R29 to the wiper arm of resistor R27. A capacitor C21 is coupled between terminal G2 and chassis ground.

As mentioned previously, the television receiver is placed in the standby mode of operation by disabling horizontal deflection generator 40 when trace switch 45 short-circuits deflection retrace circuit 55. Horizontal scan is disabled almost immediately after receipt of the off-state of command signal 60, thereby inhibiting almost immediately the sweep of the electron beams. However, the cessation of electron emission from the cathodes of picture tube 35 and the collapse of the ultor voltage at terminal U may not occur as immediately.

To prevent spot burning of a small region of the phosphor screen by electrons emitted from the cathodes and accelerated to the phosphor screen before collapse of the ultor voltage, an electron beam suppression circuit 50 embodying the invention is coupled to the grid and screen electrodes and to the voltage supply terminal G.

As part of suppression circuit 50, a switching transistor Tr2 is coupled between chassis ground and the junction terminal of resistors R25–R27 of voltage divider 70. A capacitor 20 is coupled across resistor R25 of voltage divider 70. The base of switching transistor Tr2 is coupled to the collector of transistor Tr1.

The conduction state of switching transistor Tr2 is determined by the state of the remote on/off command signal 60 developed by remote control circuit 30. During normal running mode of television receiver operation, current from hold rail 32, biases transistor Tr1 into saturated conduction, removing base current from transistor Tr2, maintaining Tr2 in cutoff. Current from terminal G of high voltage circuit 25 flows through resistors R28, R27 and R25 to maintain diode D21 conducting and to maintain grid voltage terminal G1 grounded, as is required during normal mode operation. The voltage at the wiper arm of resistor R27 is coupled to the G2 terminal, developing at that terminal a voltage slightly greater than one-half the voltage $V_G$, also as is required during normal running operation.

Via diode D21, resistors R25 and R26 are parallel connected. Capacitor 20 is charged to the voltage $V_{BL}$ being developed across resistor R25.

When the off-state of the command signal is developed by remote control circuit 30, transistor Tr1 is cut off, enabling transistor Tr2 to become forward biased by the current flowing from the $V_{cc}$ supply through resistors R22 and R23. Junction terminal 71, at the top plate of capacitor C20, is now at chassis ground potential bringing the voltage at grid voltage terminal G1 to a negative voltage of magnitude equal to that of voltage $V_{BL}$, the voltage being developed across capacitor C20. Diode D21 becomes reverse biased.

The conduction of transistor Tr1, therefore, disables the application of the energizing potential $V_G$ and in fact produces a negative voltage at grid electrode terminal G1. This negative voltage produces the cutoff or suppression of the generation of electron beams in picture tube 35. Spot burning of the phosphor screen is prevented.

The blocking potential $V_{BL}$ is quickly applied to grid electrode terminal G1 upon receipt of the off-state of command signal 60. Because of the turn off delay in Darlington switching transistor Q2, the disabling of horizontal deflection generator 40 is delayed until after the blocking potential $V_{BL}$ has been applied to grid electrode terminal G1. Thus, the suppressing of the generation of electron beams occurs prior to the disabling of the generation of scanning current.

The relatively long discharge time constant associated with capacitor C20 maintains the grid electrode in cutoff sufficiently long so that no beam spot appears even after elapse of the one second off-state of command signal 60.

At the same time that the blocking potential $V_{BL}$ is applied to terminal G1, the voltage at screen terminal G2 begins to decrease to a lower voltage level due to the grounding of terminal 71 by conduction of transistor Tr2. The discharge of capacitor C21 occurs at a rate determined by the time constant associated with capacitors C21 and C22 and resistors R27-R29.

During the entire standby interval, transistor Tr2 remains in saturation by the current flowing from the +12V standby supply. When the television receiver is again switched into the normal running mode of operation by receipt of the on-state of command signal 60, transistor Tr2 becomes cut off due to the conduction of transistor Tr1. Terminal G1 is again clamped to ground by the conduction of diode D21 after sufficient voltage $V_G$ is developed at terminal G.

The development of adequate voltage at screen terminal G2 is delayed significantly after receipt of the on-state of command signal 60 principally due to the delay in charging capacitor C20 through resistor R27. Such delay in obtaining adequate voltage at screen terminal G2 is desirable to ensure that no beam spot becomes visible even should the television receiver be turned on while the cathode electrodes are still hot and while a substantial ultor voltage still remains at terminal U. Such a situation may occur when the television receiver is rapidly cycled between standby and normal running modes of operation.

An additional feature of electron beam suppression circuit 50 embodying the invention is that short-circuit or overload conditions occurring at horizontal output transformer T1 activate the circuit. For example, under an overload condition, the pulse voltage across winding w3 changes sufficiently in characteristic such that the voltage $V_b$ decreases substantially, e.g. decreases below 7 volts, such that zener diode D5 becomes blocked. The hold current at hold rail 32 becomes zero, cutting off transistor Tr1. Transistor Tr2 is switched on, activating circuit 50 into suppressing generation of the electron beam.

The generation of the electron beam continues to be suppressed until the standby voltage $V_a$ decreases towards zero. The voltage $V_a$ decreases to zero more slowly than the other operating voltages because the voltage $V_a$ powers remote control circuit 30 and is therefor designed to be present during the transistion between normal running and standby modes of operation.

When the television receiver is disconnected from the mains supply that develops the input voltage $V_{in}$, electron beam suppression circuit 50 is activated in a manner similar to that previously described.

As an alternative arrangement, saving the use of a resistor, resistor R26 may be omitted, with terminal 71 being connected to the junction of R25, R27, C20 and the collector electrode of transistor Tr2. Resistor R25, in this alternative arrangement, is decreased to about one-third the value shown in the FIGURE, resulting in a smaller time constant being associated with capacitor C20.

What is claimed is:

1. An electron beam suppression circuit for a television display system, comprising:
   a picture tube having a display surface and a plurality of electrodes;
   a source of potential for energizing at least one of said plurality of electrodes to generate an electron beam that impinges on said display surface;
   a deflection winding;
   a deflection generator coupled to said deflection winding for generating scanning current therein to produce a sweep of said electron beam across said display surface;
   means for developing a command signal having first and second states;
   means including a first switch coupled to said deflection generator and responsive to said command signal for disabling normal generation of said scanning current to inhibit normal sweep of said electron beam upon the occurrence of the first state of said command signal;
   means for developing a blocking potential; and
   means including a second switch responsive to said command signal and coupled to said one electrode for applying thereto said blocking potential upon the occurrence of said first state of said command signal to suppress generation of said electron beam.

2. An electron beam suppression circuit according to claim 1 wherein said command signal developing means comprises a remote control circuit that develops said first state of said command signal when it is desired to switch operation of said television display system to a standby mode of operation and that develops said second state of said command signal when it is desired to switch operation of said television display system to a normal mode of operation.

3. An electron beam suppression circuit according to claim 1 wherein upon the occurrence of said first state of said command signal said first switch changes conductive states after said second switch changes conductive states to suppress generation of said electron beam prior to disabling normal generation of said scanning current.

4. An electron beam suppression circuit according to claim 1 wherein said deflection generator includes a trace switch coupled to said deflection winding and operated at a deflection rate for generating said scanning current and a retrace capacitance coupled to said deflection winding for forming therewith a retrace resonant circuit during a retrace interval of a deflection cycle and wherein said normal scanning current generation disabling means includes means coupled to said first switch for disabling said retrace resonant circuit upon the occurrence of said first state of said command signal.

5. An electron beam suppression circuit according to claim 1 wherein said deflection generator operates in a normal mode when said command signal is in said second state to produce a pulse voltage during a deflection cycle, and including means responsive to said pulse voltage and coupled to said first and second switches for holding said two switches in given conductive states until the occurrence of said first state of said command signal upon which occurrence said two switches change to other conductive states that will result in the suppression of the generation of said electron beam and the disablement of the generation of said scanning current.

6. An electron beam spot suppression circuit according to claim 5 wherein said holding means includes a power transformer coupled to a load circuit of said television display system such that when said load circuit draws excessive current, said pulse voltage changes sufficiently in characteristic to disable said holding means, resulting in said first and second switches changing to said other conductive states.

7. An electron beam suppression circuit according to claim 1 including a voltage divider coupled to said one electrode and to said second switch and wherein said electrode energizing potential is applied to said voltage divider.

8. An electron beam suppression circuit according to claim 7 wherein said blocking potential developing means comprises a capacitance coupled to said second switch and coupled between two terminals of said voltage divider.

9. An electron beam suppression circuit according to claim 8 including a second one of said plurality of electrodes coupled to said voltage divider and being energized by said source of energizing potential.

10. An electron beam suppression circuit for a television display system, comprising:
 a picture tube having a display surface and a plurality of electrodes;
 a source of energizing potential for applying to at least one of said plurality of electrodes to generate an electron beam that impinges on said display surface;
 a deflection winding;
 a deflection generator coupled to said deflection winding for generating scanning current therein to produce a sweep of said electron beam across said display surface;
 means for developing a command signal having first and second states;
 means including a first switch couples to said deflection generator and responsive to said command signal for disabling normal generation of said scanning current to inhibit normal sweep of said electron beam upon the occurrance of the first state of said command signal; and
 means including a second switch responsive to said command signal and coupled to one of said plurality of electrodes for disabling the application thereto of said energizing potential upon the occurrence of said first state of said command signal to suppress generation of said electron beam.

11. An electron beam suppression circuit according to claim 10 wherein said command signal developing means comprises a remote control circuit that develops said first state of said command signal when it is desired to switch operation of said television display system to a standby mode of operation and that develops said second state of said command signal when it is desired to switch operation of said television display system to a normal mode of operation.

12. An electron beam suppression circuit according to claim 11 wherein upon the occurrence of said first state of said command signal said first switch changes conductive states after said second switch changes conductive states to suppress generation of said electron beam prior to disabling normal generation of said scanning current.

13. An electron beam suppression circuit according to claim 11 wherein said deflection generator includes a trace switch coupled to said deflection winding and operated at a deflection rate for generating said scanning current and a retrace capacitance coupled to said deflection winding for forming therewith a retrace resonant circuit during a retrace interval of a deflection cycle and wherein said normal scanning current generation disabling means includes means coupled to said first switch for disabling said retrace resonant circuit upon the occurrence of said first state of said command signal.

14. An electron beam suppression circuit according to claim 11 wherein said deflection generator operates in a normal mode when said command signal is in said second state to produce a pulse voltage during a deflection cycle, and including means responsive to said pulse voltage and coupled to said first and second switches for holding said two switches in given conductive states until the occurrence of said first state of said command signal upon which occurrence said two switches change to other conductive states that will result in the suppression of the generation of said electron beam and the disablement of the generation of said scanning current.

15. An electron beam spot suppression circuit according to claim 14 wherein said holding means includes a power transformer coupled to a load circuit of said television display system such that when said load circuit draws excessive current, said pulse voltage changes sufficiently in characteristic to disable said holding means, resulting in said first and second switches changing to said other conductive states.

16. An electron beam suppression circuit according to claim 11 including a voltage divider coupled to said one electrode and to said second switch and wherein said energizing potential is applied to said voltage divider.

17. An electron beam suppression circuit according to claim 16 wherein said disabling means comprises a capacitance coupled to said second switch and coupled between two terminals of said voltage divider.

18. An electron beam suppression circuit according to claim 17 including a second one of said plurality of electrodes coupled to said voltage divider and being energized by said source of energizing potential.

* * * * *